(12) United States Patent
Lahade et al.

(10) Patent No.: US 7,242,394 B2
(45) Date of Patent: Jul. 10, 2007

(54) SLIDABLE ELECTRONIC WHITEBOARD SYSTEM

(75) Inventors: Sudhakar S. Lahade, Norcross, GA (US); James D. Watson, Duluth, GA (US); Mark A. Zeh, Mountain View, CA (US); Michael H. Dunn, Dunwoody, GA (US); Peter W. Hildebrandt, Duluth, GA (US)

(73) Assignee: Polyvision Corp., Suwanee, GA (US)

( * ) Notice: Subject to any disclaimer, the term of this patent is extended or adjusted under 35 U.S.C. 154(b) by 199 days.

(21) Appl. No.: 10/453,046

(22) Filed: Jun. 2, 2003

(65) Prior Publication Data

US 2004/0239640 A1 Dec. 2, 2004

(51) Int. Cl.
G09G 5/00 (2006.01)
(52) U.S. Cl. .............. 345/173; 345/174; 345/175; 345/1.1; 345/1.2; 345/2.1; 345/2.3; 178/18.01
(58) Field of Classification Search ............. 345/173, 345/174–175, 1.1, 1.2, 2.1, 2.3; 178/18.01
See application file for complete search history.

(56) References Cited

U.S. PATENT DOCUMENTS

| 5,067,287 | A  | * | 11/1991 | Lewis .................. 52/29 |
| 6,189,268 | B1 |   | 2/2001  | Carr et al. |
| 6,367,902 | B1 | * | 4/2002  | Saund et al. ......... 346/139 R |
| 6,434,644 | B1 | * | 8/2002  | Young et al. ............ 710/63 |
| 6,518,960 | B2 | * | 2/2003  | Omura et al. .......... 345/177 |
| 2003/0039094 | A1 | * | 2/2003 | Sarkinen et al. ........ 361/681 |

FOREIGN PATENT DOCUMENTS

| GB | 2 321 786 | A |   | 8/1998 |
| GB | 2 321 786 | A |   | 2/2001 |
| GB | 2 363 891 | A |   | 1/2002 |
| GB | 2 363 891 | A | * | 1/2002 |
| WO | 2002/094060 | A |   | 11/2002 |
| WO | WO-02/094060 | A1 |  | 11/2002 |

OTHER PUBLICATIONS

PCT, International Search Report, PCT/US2004/017391.
PCT, Written Opinion of the International Searching Authority, PCT/US2004/017391.
TEAMBOARD, "Simple and Effective Communication", Jan. 1998, XP-002317179.
TEAMBOARD: "Simple and effective communication"[Online]Jan. 1998, XP002317179 Retrieved from the Internet: URL: <www.emistech.com/downloads/teamboard.pdf>[retrieved on Feb. 9, 2005].
Article 96(2) Communication from the European Patent Office for Application No. 04 754 082.8—1245, dated Jun. 12, 2006.

* cited by examiner

*Primary Examiner*—Richard Hjerpe
*Assistant Examiner*—Leonid Shapiro
(74) *Attorney, Agent, or Firm*—Ryan A. Schneider, Esq.; Seyed Kaveh E. Rashidi-Yazd, Esq.; Troutman Sanders LLP

(57) ABSTRACT

The present invention provides movable visual communication systems, more specifically movable electronic whiteboard systems. The invention provides an electronic whiteboard having at least one positioning member and a guide element adapted to receive the positioning member, wherein the electronic whiteboard and the positioning member are movable along the guide element. The guide element can house an extendable or retractable line that maintains connectivity with the electronic whiteboard at any point along the guide element.

22 Claims, 9 Drawing Sheets

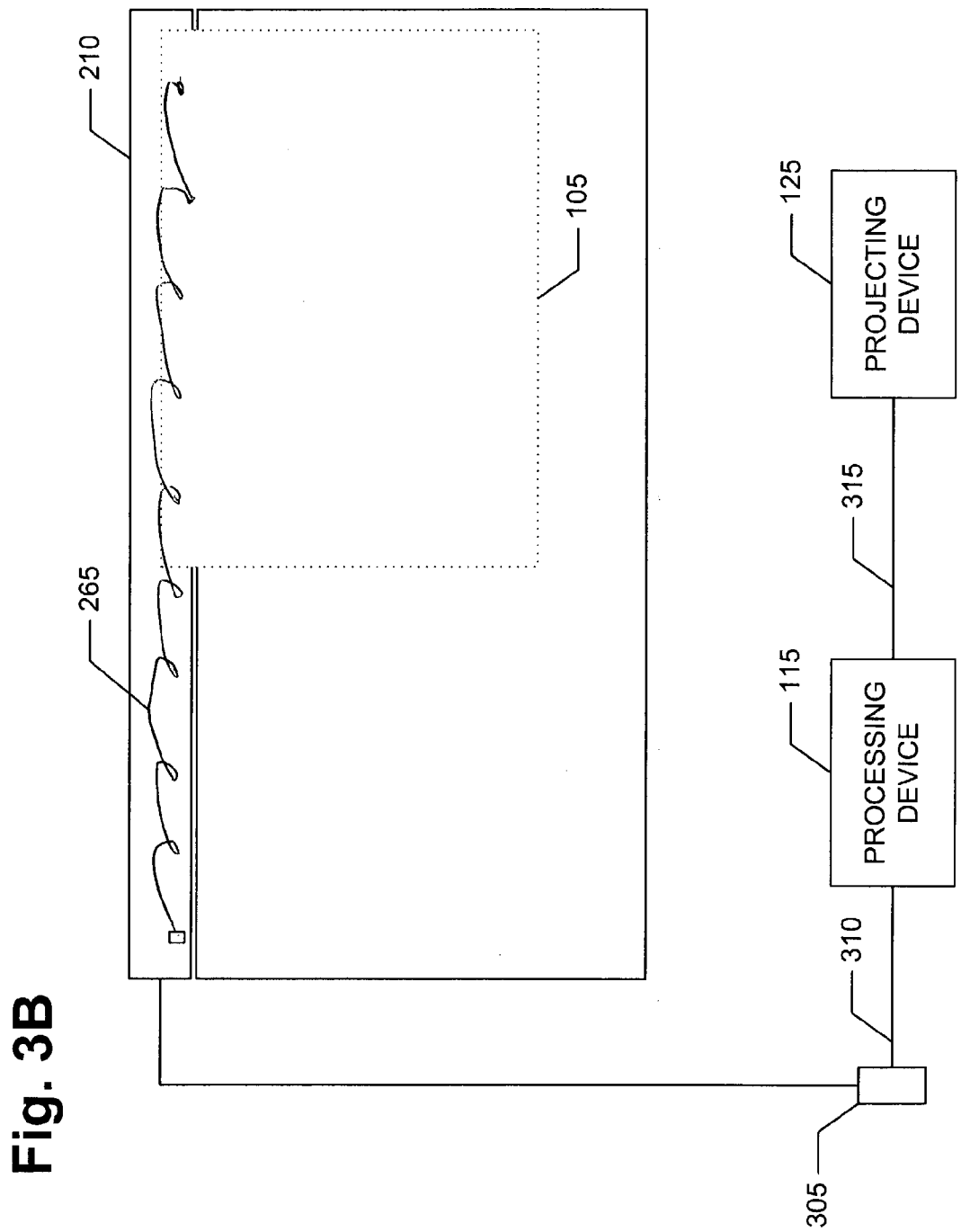

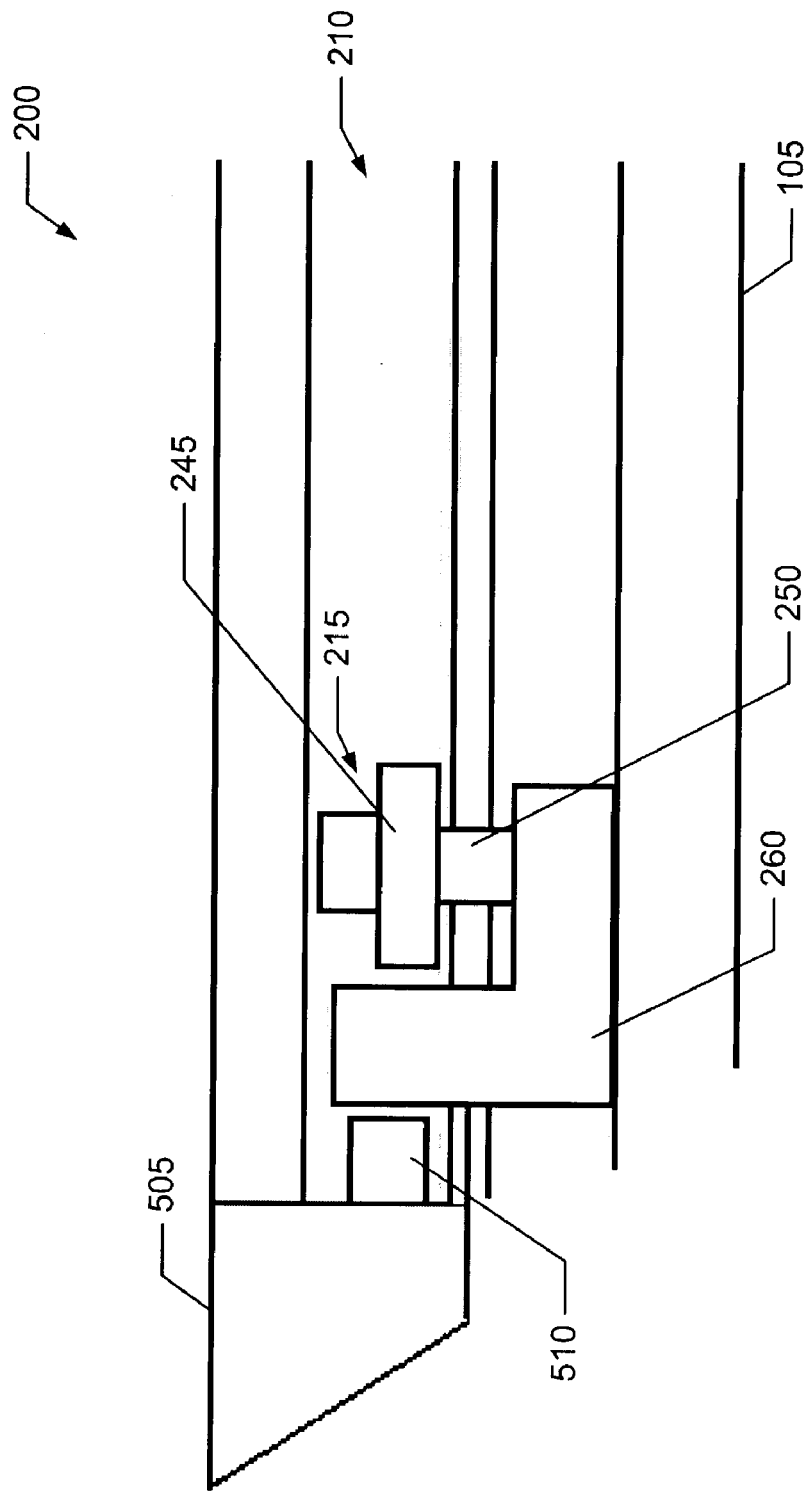

SLIDABLE ELECTRONIC WHITEBOARD SYSTEM

BACKGROUND OF THE INVENTION

1. Field of the Invention

This invention relates generally to the field of visual communication systems, and more particularly to electronic whiteboards and movable interactive electronic whiteboard systems.

2. Description of Related Art

Electronic whiteboards provide many benefits to users during lectures, meetings, and presentations. During meetings and presentations, not only do electronic whiteboards allow users to present electronic presentations, electronic whiteboards also permit handwritten notes on the whiteboard to be saved electronically for future reference.

In the classroom setting, electronic whiteboards are advantageous as they provide educators with a modern and user-friendly teaching tool. Educators prefer electronic whiteboards because of their versatility. Electronic whiteboards allow educators to project virtually any text and images onto the whiteboard as well as write along side of any projected image and markup projected images with electronic ink.

Although electronic whiteboards are increasing in popularity, using electronic whiteboards in existing settings is problematic because of existing visual aids and limited wall space in the front of classrooms. For example, classrooms typically have visual aid devices such as charts, markerboards, maps, and information placed on a wall in the front of the class. Thus, in some existing classrooms and auditoriums, additional visual communication devices such as electronic whiteboards may not have sufficient space to be installed. Installing an electronic whiteboard may require removal of an existing visual aid. Rather than remove existing visual communication devices, a user may desire to combine the use of electronic whiteboards with existing visual aid devices including stationary dry-erase whiteboards, chalkboards, or tackboards.

Current methods of solving this problem include mobile electronic whiteboards, wherein the electronic whiteboards are free-standing and not secured to a wall. Thus, these mobile electronic whiteboards have their own stands and power cords, which are safety hazards because people can easily trip over the cords and the stands. Also, these electronic whiteboards are inconvenient because a larger amount of space is needed to store these mobile units.

Thus, there is a need for movable electronic whiteboard systems.

There is further need for positionable electronic whiteboard systems that are compatible with existing room structures.

There is still another need for track systems for movable electronic whiteboard systems.

BRIEF SUMMARY OF THE INVENTION

The present invention provides movable visual communication systems. Although the present invention will be described with reference to an electronic whiteboard system, it will be appreciated that the invention encompasses aspects of other types of visual communication systems, including but not limited to, interactive visual communication systems, whiteboards, chalkboards, plasma displays, message boards, and distributed computing networks. Accordingly, one aspect of the present invention provides a movable electronic whiteboard system having an electronic whiteboard with at least one positioning member. The system also includes a guide element adapted to receive the positioning member. Additionally, the electronic whiteboard and the positioning member can be movable along the guide element, wherein the electronic whiteboard and positioning member can be positioned along the guide element by applying an amount of force to the electronic whiteboard—causing the electronic whiteboard to change its position, for example sliding the electronic whiteboard along the guide element.

Another aspect of the invention is directed to a track system for an electronic whiteboard. The track system includes a guide element adapted to receive a positioning member of an electronic whiteboard. The guide element is capable of receiving the positioning member along a length of said guide element. By receiving the positioning member of the electronic whiteboard, the guide element and the electronic whiteboard are operatively connected so that the electronic whiteboard can be positioned along the length of the guide element. When the guide element is fastened to a wall, for example, the guide element supports the electronic whiteboard. The guide element can also house a power communicator, for example a retractable line including a coiled or spooled line, for connecting the electronic whiteboard with a power source. The line can be configured such that a connection with the electronic whiteboard is maintained at any position of the electronic whiteboard along the length of the guide element. Housing the line in the guide element helps reduce or eliminate the number of exposed or exterior lines that can cause clutter, and to prevent obstacles to users.

Yet another aspect of the present invention provides a track system for an electronic whiteboard having a guide element adapted to receive an electronic whiteboard so that the electronic whiteboard is positionable on said guide element. The guide element can house an extendable line. The extendable line can maintain connectivity with the electronic whiteboard and the track system independent of the position of said electronic whiteboard on the guide element while remaining housed within the guide element. The guide element can also conduct or transmit power or data to or from the electronic whiteboard as necessary.

BRIEF DESCRIPTION OF THE FIGURES

FIGS. 3A and 3B is a graphical representation of an exemplary movable electronic whiteboard track system mounted above an existing whiteboard, wherein a portion of the housing is removed.

FIG. 5 is a top view of an end of an exemplary movable electronic whiteboard system in accordance with another exemplary embodiment of the present invention.

DETAILED DESCRIPTION

Figure 1:
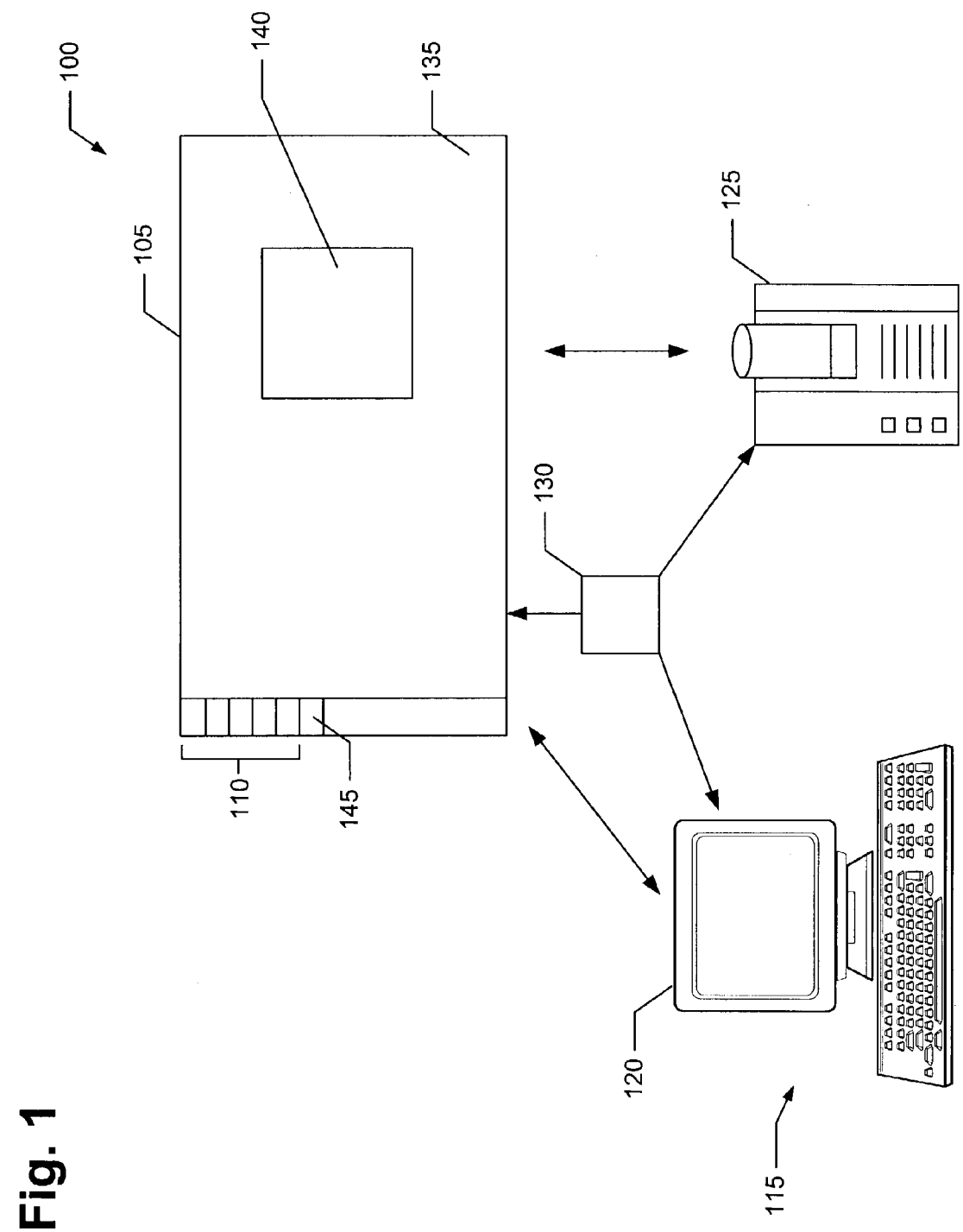
FIG. 1 is an exemplary system diagram of a movable electronic whiteboard system in accordance with a first embodiment of the present invention.

Referring now to the above figures, wherein like reference numerals represent like parts throughout the several views, the apparatus and system for a movable electronic whiteboard system will be described in detail.

Electronic Whiteboard Systems

FIG. 1 depicts an exemplary electronic whiteboard system 100 of the present invention. The electronic whiteboard system 100 includes an electronic whiteboard 105 operatively connected to a processing device 115. Processing device 115 can be an integrated component of the electronic whiteboard, or processing device 115 can be an external component. Suitable processing devices include computing devices such as personal computers.

Electronic whiteboards 105 are known in the art and can receive input from a user in a variety of ways. For example, electronic whiteboards 105 can incorporate capacitance technology and receive input from a user via an electrically conductive stylus. The stylus can be a writing implement including a finger. An exemplary stylus can transmit a signal to electronic whiteboard 105 indicating the location of the stylus in relation to a surface of electronic whiteboard 105. The stylus can also transmit other information to electronic whiteboard 105 including but not limited to pen color, draw or erase mode, line width, font or other formatting information.

In another embodiment, electronic whiteboard 105 can be touch sensitive or pressure sensitive. Touch sensitive or pressure sensitive means having the capability to convert a physical contact into an electrical signal or input. Touch sensitive electronic whiteboards can incorporate resistive membrane technology. See for example U.S. Pat. No. 5,790,114 to Geaghan et al. describing resistive membrane electronic whiteboards, and which patent is incorporated herein in its entirety.

In one embodiment, electronic whiteboard 105 has two conductive sheets physically separated from one another, for example by tension, such that the two sheets contact each other in response to a touch or physical pressure. The sheets are made of a conductive material or can be coated with a conductive material such as a conductive film, and can be deformable. Touching, writing, or other application of pressure on the surface of the conductive sheets causes contact between the two conductive sheets resulting in a detectable change in voltage or resistance. The sheets can act as resistance dividers and a voltage gradient can be created by applying different voltages at the edges of a sheet. The change in voltage or resistance can then be correlated to a location value, for example a Cartesian coordinate set. Coordinate data, for example (x,y) pairs or their equivalent, can be transmitted to processing device 115 in compatible data packets, for processing, manipulating, editing, or storing.

Other embodiments for an electronic whiteboard 105 include laser-tracking, electromagnetic, infrared, camera-based systems, and so forth. These systems detect the presence of ink markings or a pointer or stylus device across a two-dimensional surface, which can be enabled for erasure of marks made with a dry-erase maker, but do not have to be.

Conventional dry-erase markers are typically used to write on a surface of electronic whiteboard 105, but other erasable or removable ink, pigment, or coloring can be used to physically mark a surface of electronic whiteboard 105. The physical markings on electronic whiteboard 105 can be removed using conventional methods including an eraser, towel, tissue, hand, or other object that physically removes the markings from the surface of electronic whiteboard 105.

Electronic whiteboard 105 can also include a control area 110. Control area 110 can contain multiple control areas 145 (for example a button or a soft key) for controlling a function of the electronic whiteboard system 100. Control area 110 can be an actuator, for example a physical button 145, that can be actuated by applying pressure to control area 110. The function of control area 110 can be fixed or variable. If the function of control area 110 is variable, control area 110 can comprise a soft key 145 whose function can be controlled by processing device 115. For example, soft key 145 can have different functions depending on different application software running on processing device 115. An image or icon can be projected near control area 110 indicating the current function of a soft key 145 using a projecting device 125.

Projecting device 125 can be operatively connected to processing device 115, whiteboard 105, or both. Projecting device 125 can be a conventional projecting device for projecting a graphical user interface typically on a display 120 of the processing device 115 onto a surface 135 of the electronic whiteboard 105. Projecting device 125 can adjust for image distortions including keystoning and other optical problems, for example optical problems arising from the alignment of a projected image on surface 135 with the graphical user interface on display 120. Alternatively, processing device 115 can adjust for image or alignment problems. A user can also physically adjust projecting device 125 to compensate for image problems including keystoning.

Another embodiment of the present invention includes a plasma display or rear-projection system with a coordinate-detecting surface, such as a touch-sensitive, capacitive, camera-based, laser-tracking, electromagnetic, or others, whereby a stylus can be tracked on the surface and the video source is provided by the processing device 115. Laser-tracking technology can require specially coded pens or styluses. Laser-tracking technology utilize optical tracking interfaces using infrared lasers that track these specially coded pens or styluses as they move across the board. Regardless of the projection screen used, those present can view everything drawn on the projection screen, while the processing device captures what is drawn on the screen. Examples of laser tracking electronic whiteboards include the Webster™ Laser Tracking (LT) Series of interactive whiteboards manufactured by Polyvision Corporation, Norcross, Ga. Other electronic whiteboard technologies include ultrasonic pen tracking, infrared pen tracking, electromagnetic pen tracking, and others.

Electronic whiteboard system 100 can also include remote control device 130 that can be in communication with the electronic whiteboard system 100, or a component thereof. For example, remote control device 130 can be in communication with electronic whiteboard 105, processing device 115, projecting device 125, or a combination thereof. Communication between remote control device 130 and another component of the system 100 can be by electromagnetic technology, including, but not limited to, infrared or laser technology. Additionally, communication between remote control device 130 and electronic whiteboard system 100 can be by conventional wireless, radio, or satellite technology.

Movable Electronic Whiteboard Systems

Figure 2A:
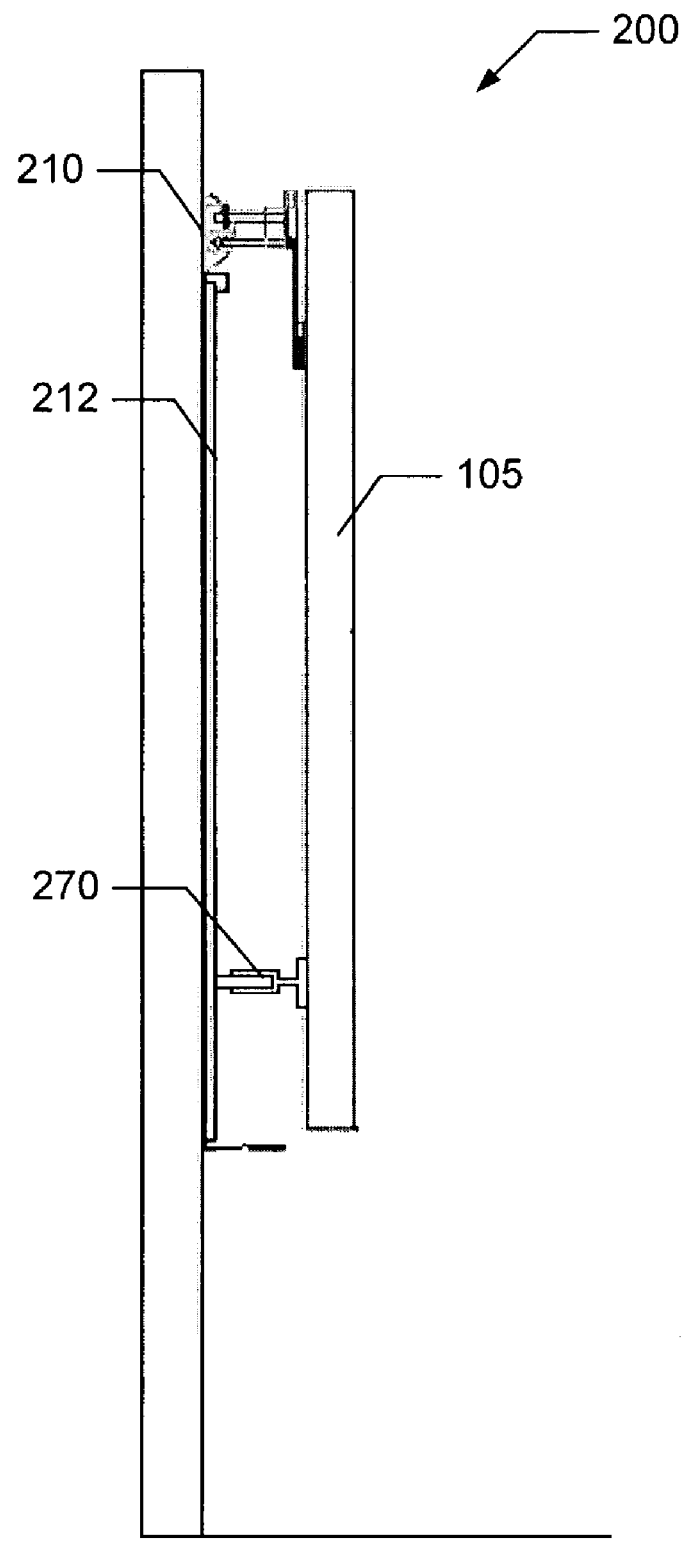
FIG. 2A is a cross sectional view of a side of a movable electronic whiteboard system mounted above an existing whiteboard in accordance with a first embodiment of the present invention.
Figure 2B:
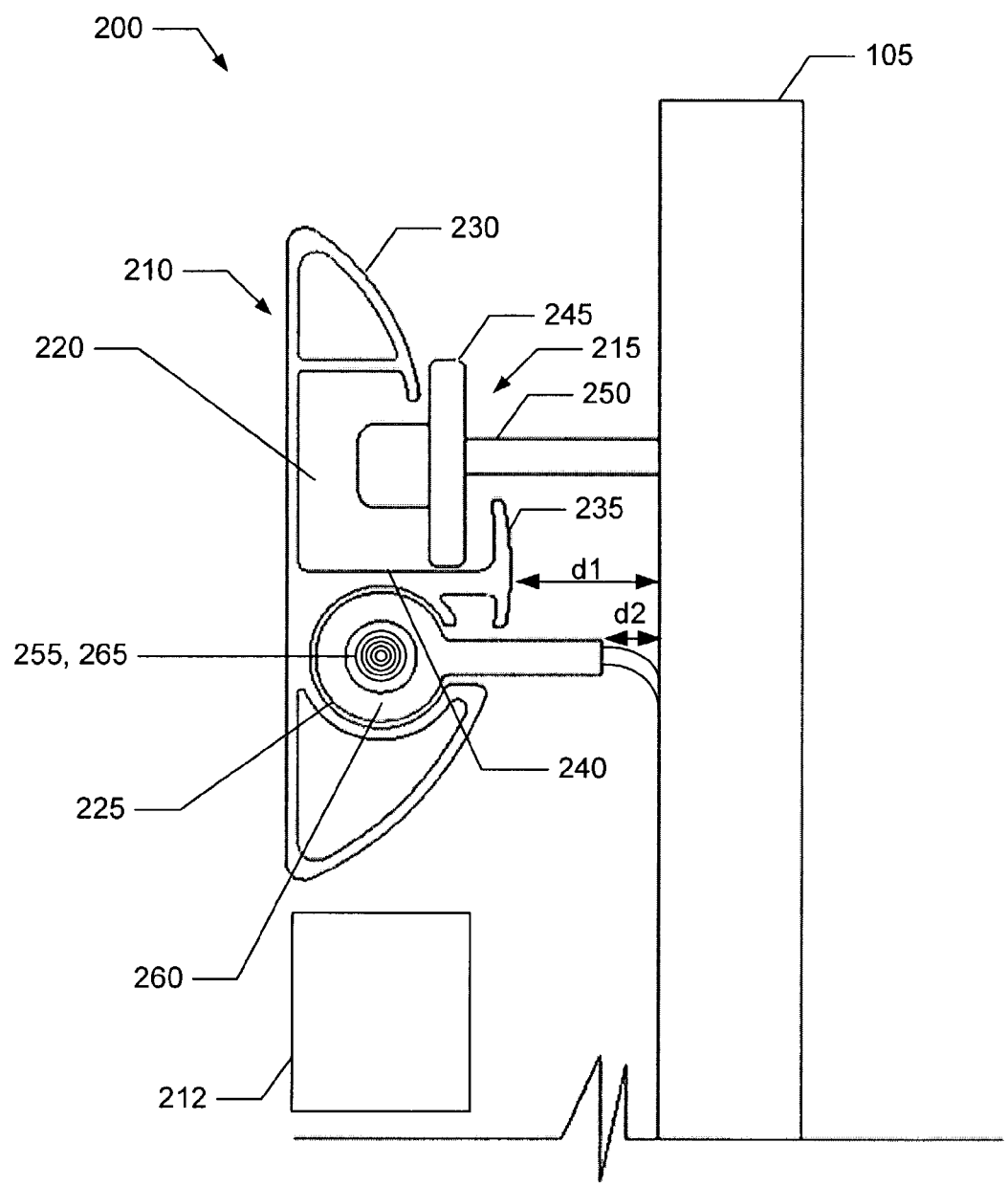
FIG. 2B is a cross-sectional exploded view of the top portion of a track system for a movable electronic whiteboard system in accordance with an exemplary embodiment of the present invention.
Figure 2C:
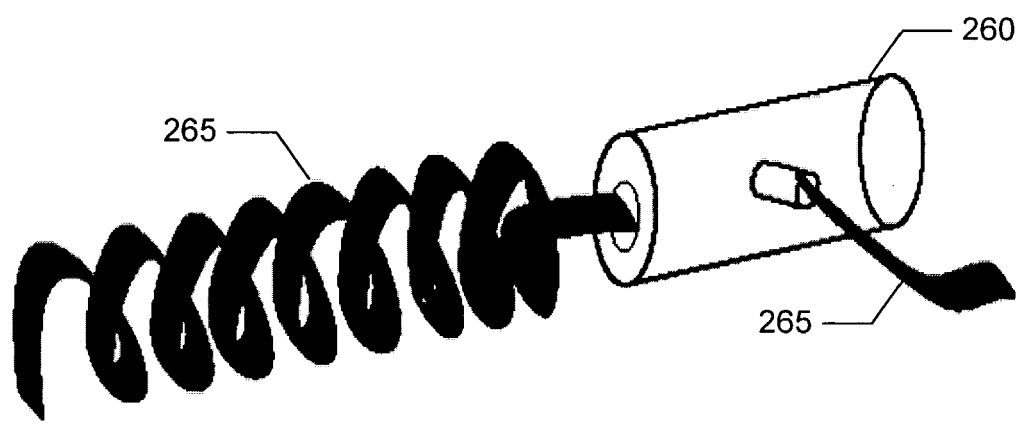
FIG. 2C is a view of the electrical coiled cable within a piston in accordance with a first embodiment of the present invention.

FIGS. 2A-2C depict cross sectional views of an exemplary movable electronic whiteboard system 200 according to one embodiment of the present invention. Generally, system 200 enables an electronic surface, for example an electronic whiteboard 105, digitizer, or the like, to be movably positioned along a surface such as a classroom wall. Movable electronic whiteboard system 200 includes a guide element 210, a positioning member 215, a first channel 220, a second channel 225, a retention member 230, and a guard member 235.

Guide element 210 can be mounted to a wall thereby permitting electronic whiteboard 105 to be movably positioned at various locations on the wall by moving electronic whiteboard 105 along guide element 210. Once electronic whiteboard 105 is moved to a desired position, electronic whiteboard 105 can be temporarily fixed at that location on guide element 210 with a securing means. In another embodiment, guide element 210 can be positioned with existing wall structure 212 so that electronic whiteboard 105 can be used in combination with existing wall structure 212. Exemplary existing wall structures include stationary whiteboards, chalkboards, tack boards, message boards, charts, maps, screens, or the like. Guide element 210 can be installed directly above, below, or beside existing wall structure 212, or alternatively, guide element 210 can be installed directly on top of such existing structure. When installed above or directly on top of one of these existing structures, the structures can still be used for their normal functions. For example, if a movable electronic whiteboard system 200 is installed directly on top of a chalkboard, both the electronic whiteboard 105 connected to guide element 210 and the chalkboard can be used in conjunction with one another. As electronic whiteboard 105 is moved along the length of the guide element 210, parts of the chalkboard or other wall structure can be exposed or concealed as needed.

Guide element 210 can be secured to the wall or to the surface of an existing structure by a suitable means, including for example, fasteners such as bolts, nails, screws, solder, or glue. In another embodiment, the guide element 210 can be embedded in the wall such that the front of the guide element 210 is flush with the surface of the wall.

Guide element 210 supports the weight of the electronic whiteboard 105. Thus, guide element 210 can be made of a durable substance, including but not limited to metal, metal alloys, woods, glasses, and plastics. In an exemplary embodiment, guide element 210 is made of a metal, such as aluminum or steel.

Electronic whiteboard 105 can be placed at various distances from guide element 210 depending on the length of positioning member 215. Distance $d_1$ defines the space between guard member 235 of guide element 210 and electronic whiteboard 105; however, the guide element 210 and the back of the electronic whiteboard 105 can be in physical contact with one another. If the guide element 210 and the electronic whiteboard 105 physically touch one another, then the coefficient of friction between the two elements should be low enough so that the electronic whiteboard 105 can move along the guide element 210 without significant resistance. Moreover, this distance $d_1$ can be greater than zero if the length of positioning member 215 is greater than $d_1$. In a preferred embodiment, distance $d_1$ is a distance sufficient to maintain electronic whiteboard 105 in a substantially vertical orientation when positioning member 215 is positioned in guide element 210.

The shape of the guide element 210 can be defined by retention member 230 and guard member 235. As shown in FIG. 2B, retention member 230 and guard member 235 can be contoured. It will be appreciated that retention member 230 and guard member 235 can be flat or of other shapes sufficient to maintain positioning member 215 in channel 220 when the system is mounted on a wall. The back of the guide element 210 can be flat such that when it is secured to a surface, it is secured flush against the surface. However, the back of the guide element 210 can have other shapes as needed to fit to the shape of the surface to which it is to be attached.

As noted, retention member 230 can be curved or straight and can extend downward towards the base of the guide element 210. The angle of the retention member 230 with respect to the vertical axis of guide element 210 preferably can be between 0 and 90 degrees. Guard member 235 can have a straight or a curved profile. However, the guide element 210 can have other shapes, including but not limited to, L-shaped and C-shaped.

Guide element 210 can be of desired length and is preferably longer than the length of electronic whiteboard 105. Electronic whiteboard 105 can be movably positioned along the guide element 210 by sliding, pushing, or otherwise moving electronic whiteboard 105. Electronic whiteboard 105 can then be secured, for example temporarily secured, at a desired position along guide element 210. Electronic whiteboard 105 can be secured on the guide element 210 such that it can move in a direction along the guide element including but not limited to horizontally, vertically, diagonally, or along an arc.

As shown in an exemplary embodiment in FIG. 2B, electronic whiteboard 105 has a positioning member 215. Positioning member 215 connects the back of the electronic whiteboard 105 to surface 240 of channel 220 of guide element 210. Positioning member 215 can be secured to the back of electronic whiteboard 105 by suitable means, including for example, fasteners such as bolts, nails, screws, solder, glue, or other durable substance. Alternatively, positioning member 215 can be a part of electronic whiteboard 105. Positioning member 215 can be placed on surface 240 of channel 220 such that positioning member 215 can be positioned at points on the surface 240 of channel 220, thereby also positioning electronic whiteboard 105 at a point along guide element 210. Positioning member 215 can be positioned at a point on surface 240 of channel 220 by sliding, rolling, or otherwise moving across surface 240. Bearings, pulleys, or a motor can also be used to move electronic whiteboard 105. Moving electronic whiteboard 105 along guide element 210 can be automated, computer controlled, or powered.

In an exemplary embodiment, positioning member 215 can be a combination of a wheel 245 and an axle 250, such that positioning member 215 can roll across or along surface 240 of channel 220 of guide element 210. Axle 250 can be secured to the back of electronic whiteboard 105 at one end and have wheel 245 at the other end such that wheel 245 can roll along surface 240 of channel 220 of guide element 210. This combination of a wheel 245 and axle 250 can be one unitary component, or it can be separate components.

In another embodiment, axle 250 can have a length greater than distance $d_1$ such that wheel 245, which is connected to axle 250, can come into contact with surface 240 and can freely roll along the length of surface 240 of channel 220. In this exemplary embodiment, axle 250 can be made of durable material, including but not by way of limitation, metals, woods, metal alloys, plastics, and glasses. In an exemplary embodiment, wheel 245 is made of a plastic or other material with a low coefficient of friction. However, other material can be used to construct wheel 245, including metal, metal alloys, glass, wood, or rubber. Additionally, guide element 210 can be lubricated to provide a lower coefficient of friction. Alternatively, the positioning member 215 can be a rod such that rod fits within the first channel 220 to facilitate moving electronic whiteboard 105 along guide element 210.

Additionally, a plurality of wheels 245, in conjunction with a plurality of axles 250, can be used to enable movement of the electronic whiteboard 105 along guide element 210. Moreover, the combination of wheels 245 and axles 250 can support a portion of the weight of electronic whiteboard 105. Thus, a sufficient number of wheels 245 and axles 250 used should be sufficient to distribute the weight of the electronic whiteboard 105.

In still another embodiment, positioning member 215 can be operatively connected to a motor such that electronic whiteboard 105 can move along the length of guide element 210 automatically. A user can simply flip a switch or press a button on or around the electronic whiteboard system 100, or use a remote control to position the electronic whiteboard 105 at a point on guide element 210. Additionally, positioning member 215 and the motor can be networked to processing device 115 such that processing device 115 can control the positioning of electronic whiteboard 105.

To prevent electronic whiteboard 105 from becoming inadvertently detached from guide element 210, a guard member 235 can be used. Guard member 235 can be located near the edge of surface 240 of channel 220 and can extend upwards towards positioning member 215 to prevent positioning member 215 from sliding or being pulled off of guide element 210 laterally. In an exemplary embodiment, guard member 235 can be a rim that is contiguous with guide element 210 and extends vertically upward towards positioning member 215 but does not physically touch positioning member 215. Alternatively, guard member 235 can physically touch positioning member 215, but does not significantly impede the movement of the positioning member 215. Guard member 235 can also be a separate element constructed of a durable material that attaches to guide element 210.

Guard member 235 can also have a curved profile, which can be compatible with other media, such as maps, flipcharts, hooks, and shelving such that when electronic whiteboard 105 is not secured to guide element 210, the other media can be secured to guard member 235. Alternatively, when electronic whiteboard 105 is secured to guide element 210, these other media can be positioned beside electronic whiteboard 105 or anywhere along the length of guide element 210. Additionally, electronic whiteboard 105 itself can have an area, for example along its top, that preserves the profile such that these other media can be secured directly on top of electronic whiteboard 105.

Just as guard member 235 can be used to keep the lower end of positioning member 215 on guide element 210, retention member 230 can be used to keep the upper end of positioning member 215 on guide element 210. Retention member 230 extends at an angle from the top of guide element 210 downwards toward positioning member 215. Retention member 230 can be curved or retention member 230 can extend diagonally downwards towards positioning member 215. Retention member 230 can extend sufficiently downwards to prevent positioning member 215 from being detached from guide element 210. The angle of retention member 230 can be large enough such that retention member 230 extends over or partially over positioning member 215. If positioning member 215 is relatively narrow, then an extender can be connected to the back of positioning member 215 to increase the width of the positioning member 215 such that retention member 230 can extend over a greater area of positioning member 215. Thus, the angle of retention member 230 preferably can be between 0 and 90 degrees.

In yet another embodiment, guide element 210 includes channel 225 that can house a line 255, which can include an electrical cable 265. Piston 260 can be positioned inside channel 225 of guide element 210 to contain electrical cable 265 and to facilitate the coaxial movement of electrical cable 265 through guide element 210. Piston 260 can also aid in preventing line 255 from protruding from guide element 210. Thus, piston 260 can be a cylinder with a hollow shaft perpendicular to the length of the cylinder, as shown in FIG. 2C. Piston 260 can be, for example, a hollow plastic cylinder, which is six inches long and one inch in diameter. However, the cylinder of piston 260 can be as wide as channel 225 and can be constructed of a suitable material, including but not limited to, plastics, metal, wood, glass, or other suitable material.

Within the hollow portion of piston 260, an electrical cable 265 supplying both power and data can be housed. Electrical cable 265 can enter piston 260 from one end and can exit piston 260 through the shaft, as depicted in FIG. 2C. In an exemplary embodiment, electrical cable 265 is coiled with ends that are straight. A straight end of electrical cable 265 enters piston 260 through an opening at one end of piston 260 and exits piston 260 through a second opening that is perpendicular to the first opening. Electrical cable 265 then connects to electronic whiteboard 105 to supply both power and data to electronic whiteboard 105. In an exemplary embodiment, electrical cable 265 is a serial cable; however, electrical cable 265 can be a variety of cables, including, but not limited to, Universal Serial Bus (USB) cable, coaxial cable, and parallel cable. Alternatively, two separate cables, running parallel to or separate from each other, can be used: one to supply power and one to supply data. It should be understood, however, that other numbers of cables can be used without deviating from the scope of this invention.

Figure 3A:
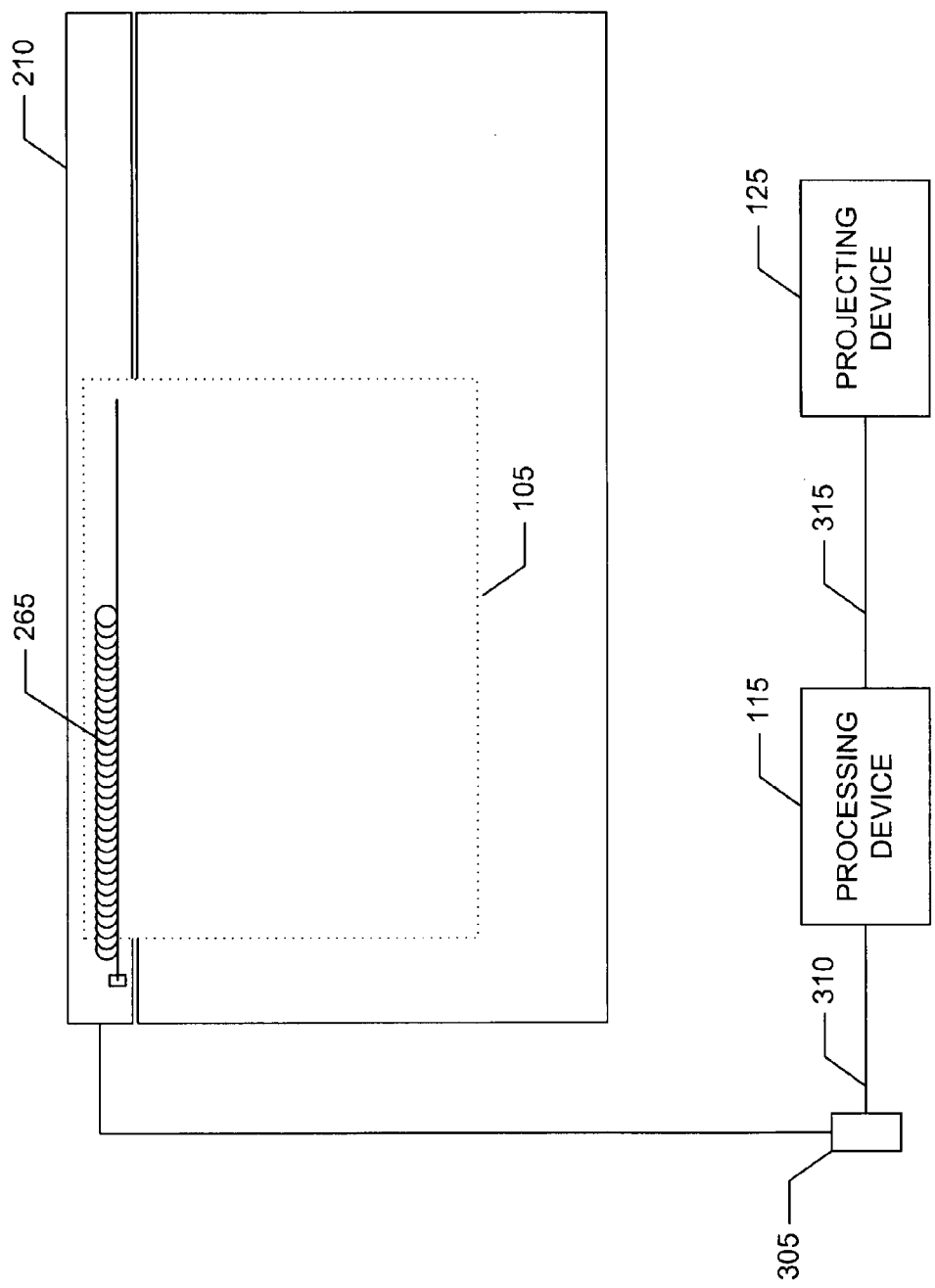

As shown in FIGS. 3A and 3B, electrical cable 265 in an exemplary embodiment is collapsible, extendable, or retractable. Electrical cable 265 can be a coiled cable. An exemplary retractable cable includes a cable on a reel or a spool.

In one embodiment, electrical cable 265 is housed within channel 225 of guide element 210. If electrical cable 265 is coiled, then electrical cable 265 in its compressed state can be stored at a first end of guide element 210. The first end is typically closest to a power outlet, electrical coupling, or attached computer. However, even in its compressed state, electrical cable 265 retains a length. The length of the compressed electrical cable 265 can be defined by the length of electronic whiteboard 105. Thus, electrical cable 265 in its extended state can have a length defined as a function of the length of electronic whiteboard 105 and as a function of the radius of channel 225. In one embodiment, the length of electrical cable 265 can be limited by approximately $2*L*\pi*r$, where L is the length of electronic whiteboard 105 and r is the radius of channel 225. This limitation could be overcome if cable 265 double-backs on itself or if electrical cable 265 is stored in layers in the guide element 210. In an exemplary embodiment, the length of electrical cable 265 in its extended state is as long as the length of guide element 210.

In another embodiment, compressed electrical cable 265 is housed in a first end of guide element 210. Electronic whiteboard 105 can have a starting position on guide element 210 when electrical cable 265 is fully compressed. At this starting position, a first end of electronic whiteboard 105 is flush with a first end of guide element 210. Typically, compressed electrical cable 265 can have a first end attached to electronic whiteboard 105 at a second end of electronic whiteboard 105 distal to the first end of guide element 210. Moving electronic whiteboard 105 along guide element 210 away from the first end of guide element 210 can cause compressed electrical cable 265 to relax and extend to maintain a connection with electronic whiteboard 105 as electronic whiteboard 105 is moved along guide element 210. In another embodiment, electrical cable 265 has a maximum coiled length defined by the length of electronic whiteboard 105. Moving electronic whiteboard 105 towards the first end of guide element 210 can cause electrical cable 265 to retract or return to a coiled configuration within guide element 210. As electronic whiteboard 105 is moved along guide element 210, electrical cable 265 remains housed in guide element 210.

At the first end of guide element 210 housing coiled electrical cable 265, a second end of electrical cable 265 exits guide element 210. In an exemplary embodiment, electrical cable 265 exits through the back of the guide element 210 and into the wall, where it runs behind the wall and connects to an outlet, for example a power source. Alternatively, a power source can be contained within guide element 210 itself such that electrical cable 265 can be conductively connected to a power source that is either wholly or partially contained within guide element 210. The power source can be an electrical outlet, or alternatively, the power source can be a battery, a solar panel, a generator, or other device or apparatus, or a combination thereof, that can supply power.

Figure 3C:
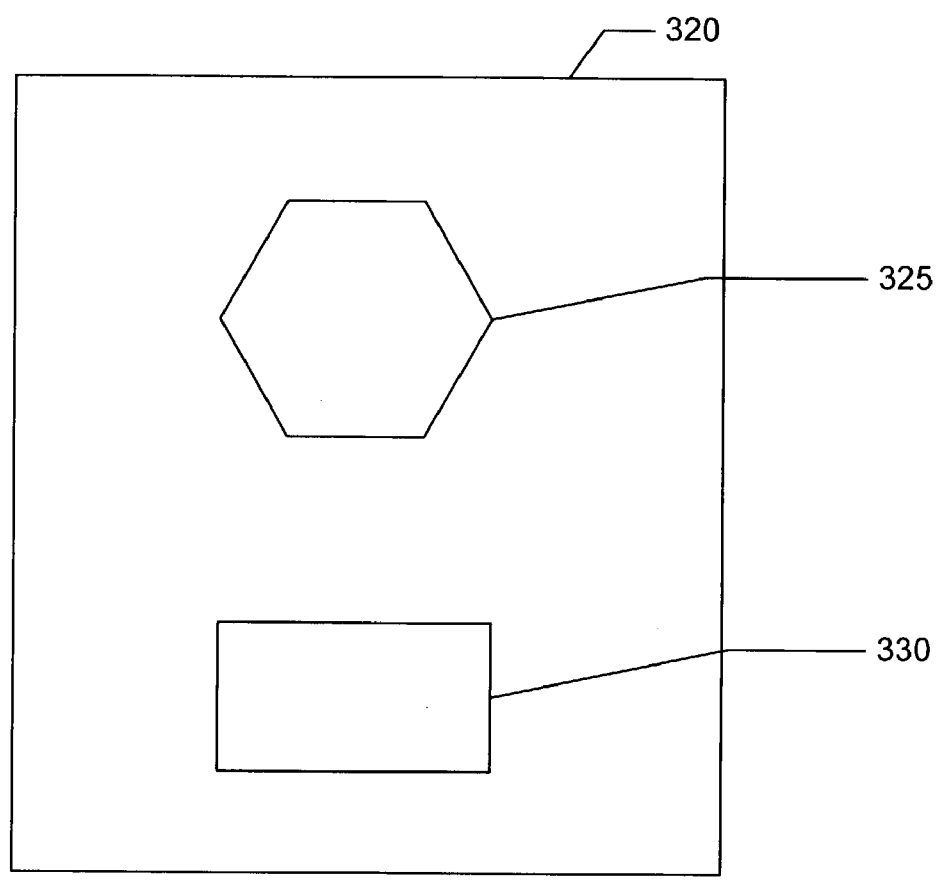
FIG. 3C is a front view of an exemplary wall jack in accordance with an exemplary embodiment of the present invention.

In still another embodiment, a single USB cable 265 can be used to supply both power and data to electronic whiteboard 105 and to supply data to the processing device 115. Alternatively, serial cable 265 can be used to supply both data and power to electronic whiteboard 105 and USB cable 310 can supply data to the processing device 115. In this embodiment, a converter 305 can be used to convert the signal carried by the serial cable 265 to a converted signal that can be carried by the USB cable 310. The placement of the converter 305 can be at numerous locations along the system; however, in an exemplary embodiment, converter 305 can be placed near an electrical outlet. The existing [320 can be adapted so that there is an electrical outlet 325 as well as a USB port 330. Thus, the serial to USB converter 305 can be placed behind the wall jack 320 of an existing electrical outlet. The serial electrical cable carrying data from electronic whiteboard 105 enters serial to USB converter 305. Exiting the serial to USB converter 305 through wall jack 320 is a USB 310 cable carrying data from electronic whiteboard 105. This USB cable 310 can connect to processing device 115. The placement of the serial to USB converter 305 is convenient because a processing device 115 can receive both data from a USB cable and power from a single location. An exemplary wall jack 320 is shown in FIG. 3C. The advantage of this wall jack 320 maximizes the cable distance, since USB cables are limited to five meters. However, the placement of the converter 305 can be at a location that is accessible to the electronic whiteboard system 100. Those skilled in the art will understand that any commercial serial to USB converter can be used, including for example, one as described in U.S. Pat. No. 6,434,644 to Young et al., which is hereby incorporated by reference in its entirety.

Referring back to FIG. 2, a wheel assembly 270 can be located near the base of electronic whiteboard 105. Wheel assembly 270 helps maintain electronic whiteboard 105 in a substantially vertical orientation. Wheel assembly 270 can slide or roll along the surface of a wall or other existing structure as electronic whiteboard 105 is moved along the length of guide element 210.

Figure 4:
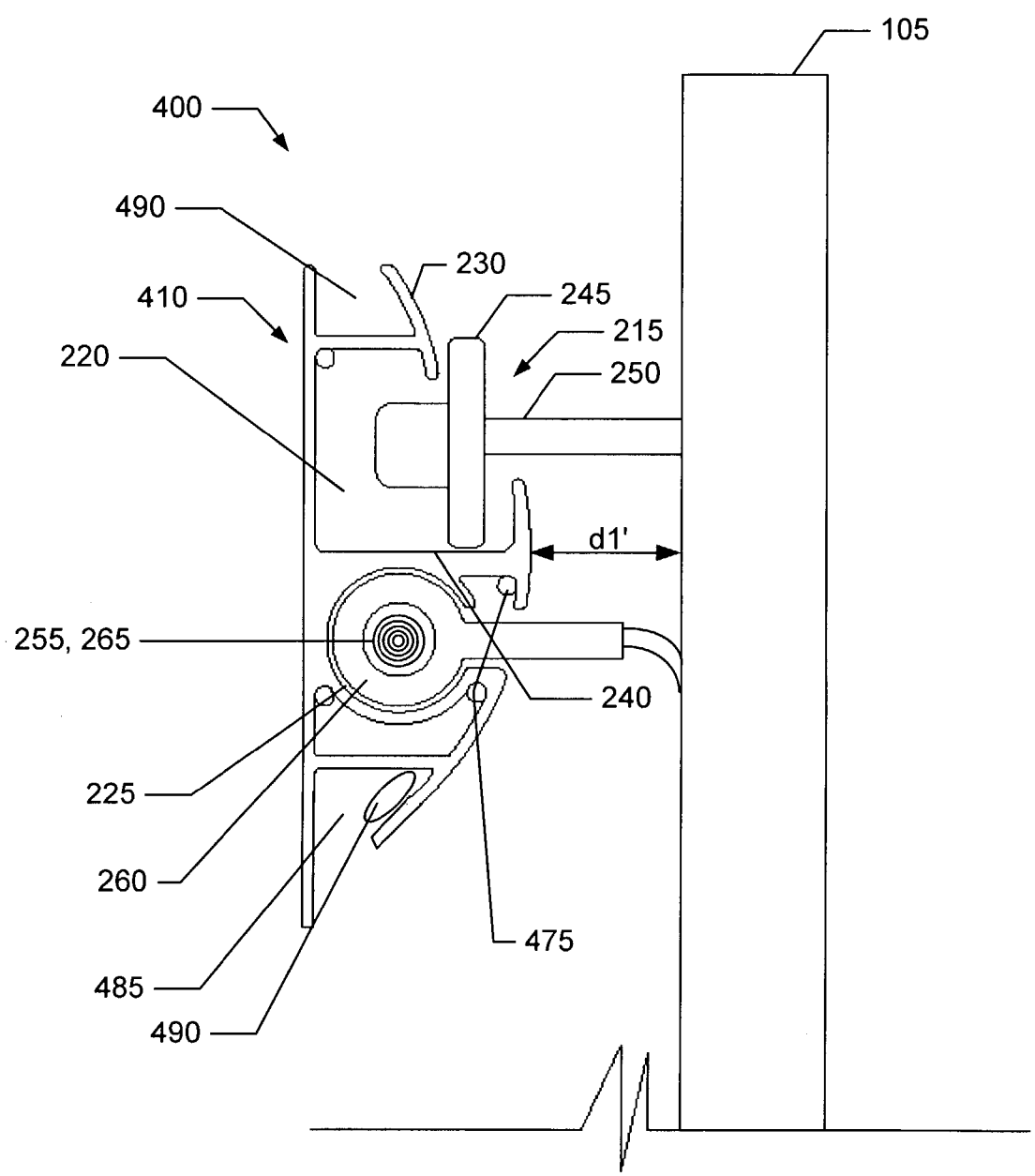
FIG. 4 is a cross-sectional view of a movable electronic whiteboard system in accordance with another exemplary embodiment of the present invention.

FIG. 4 is a cross-sectional view of a movable electronic whiteboard system 400 of an electronic whiteboard 105 according to another exemplary embodiment of the present invention. This embodiment is similar to movable electronic whiteboard system 200 except for the shape of the guide element 410. The top of guide element 410 is open forming a channel 480 that can receive mounting brackets for visual media to be used in conjunction with electronic whiteboard 105. Charts, graphs, maps, flipcharts, static whiteboards, flag holders, etc. can be mounted over guide element 410 or clipped onto retention member 230. Additionally, the bottom of guide element 410 can be open forming a channel 485 that can engage existing wall structures 212 such as chalkboards or charts could also be used to hold paper or flipchart pads. The bottom of guide element 410 can also house a securing element 490, wherein securing element 490 secures other media such as maps, charts, papers or other exhibit to the guide element 410. Securing element 490 can be a nylon roller or a paper clip or other means to secure the medial to guide element 410.

FIG. 5 is a top view of one end of movable electronic whiteboard system 200 depicting end cap 505, shock absorber 510, and a stopper. End cap 505 can be fastened to the guide element 210 by suitable means including, for example, screws, nails, bolts, glue, or solder. If, for example, screws, nails, or bolts are used, then studs can be used to receive the fasteners to secure the end cap 505 to the guide element 210. End cap 505 can be a piece of plastic secured to the guide element 210 at each end so that the internal components of the track system 200 are contained. However, other material can be used as an end cap 505, including but not limited to, glass, metal, rubber, cardboard, wood, cloth, or other material that can contain internal components of the track system 200.

FIG. 5 also shows a shock absorber 510. As electronic whiteboard 105 moves along guide element 210 and reaches an end, shock absorber 510 prevents electronic whiteboard 105, and specifically piston 260, from reaching the end cap 505 and absorbs energy resulting form electronic whiteboard 105 impacting shock absorber 510. Shock absorber 510 can be constructed of a material strong enough to absorb a large amount of force without dislodging from the guide element 210. Thus, in an exemplary embodiment, the shock absorber 510 is constructed of rubber, silicon, plastic or metal fastened to the guide element 210.

An optional stopper, not shown in the Figures. can be placed at each end of the positioning member 215 to prevent positioning member 215 from coming into contact with the shock absorber 510. The stopper can be constructed of material such as rubber or silicon to absorb the shock from when the electronic whiteboard 105 reaches the shock absorber 510 and to prevent damage to positioning member 215.

Other optional elements can be used with the movable electronic whiteboard system 200. For example, a locking mechanism can be used to secure electronic whiteboard 105 to a fixed location along the length of guide element 210. The locking mechanism can be a brake, an impedance or obstruction on the guide element, or other mechanical or electrical device that can prevent electronic whiteboard 105 from moving along the guide element 210. The locking mechanism can be manually placed or a user could also electronically activate the locking mechanism. Additionally, processing device 115 can be used to send a command to movable electronic whiteboard system 200 such that the locking mechanism actuates. The locking mechanism can also be automatic such when electronic whiteboard 105 stops moving along guide element 210, the locking mechanism actuates and prevents the electronic whiteboard from moving any further unless the user electronically permits further movement of electronic whiteboard 105.

In another embodiment, guide element 210 itself can be electrically conductive. In this embodiment, electronic whiteboard 105 can continuously maintain a contact with a power source. An insulator can be used to cover the outer surface of guide element 210 to prevent users or others from being shocked by the electrically enabled guide element 210. Low voltage can also be used.

Additionally, more than one guide element 210 can be used. For example, one guide element 210 can be attached to a surface such that guide element 210 is horizontal to the floor. Another guide element 210 can be attached to a surface such that the length of guide element 210 is perpendicular to the floor. In this embodiment, the electronic whiteboard 105 can move horizontally along one guide element 210, and then vertically along the other guide element 210. Thus, several guide elements 210 can be attached to a surface in various directions such that the electronic whiteboard can move in various directions. Additionally, the guide elements 210 can be tiered such that several electronic whiteboards 105 can positioned on top of one another.

Even though the exemplary embodiments illustrated herein describe a track system for a touch sensitive electronic whiteboard, it should be understood that any electronic communication device can be enabled through said track system, including, for example, any electronic or interactive board, plasma displays, televisions, etc.

It will also be appreciated that various modifications can be made to the invention as described without departing from the spirit of the invention or the scope of the appended claims.

What is claimed is:

1. In a visual communication system including an electronic whiteboard and a wall upon which the electronic whiteboard is attached, an improvement to the visual communication system comprising a movement device located behind the electronic whiteboard that enables lateral movement of the electronic whiteboard device relative the wall.

2. The improved visual communication system of claim 1, the electronic whiteboard having at least one adjustable positioning member extending from behind the electronic whiteboard, and the movement device being a guide element adapted to receive the positioning member, wherein the electronic whiteboard and the positioning member are movable along the guide element, and the distance between the wall and the whiteboard being adjustable.

3. The improved visual communication system of claim 2, further comprising a computing device operatively coupled to the electronic whiteboard.

4. The improved visual communication system of claim 3, further comprising a motor to move electronic whiteboard, and wherein the electronic whiteboard is electrically coupled to the guide element.

5. The improved visual communication system of claim 3, wherein the guide element conducts data between the electronic whiteboard and a computing device.

6. The improved visual communication system of claim 2, wherein the guide element houses a retractable line for maintaining connectivity with the electronic whiteboard.

7. The improved visual communication system of claim 2, the electronic whiteboard comprising a touch sensitive surface.

8. The improved visual communication system of claim 2, the electronic whiteboard comprising a laser-tracking surface.

9. The improved visual communication system of claim 4, further comprising a remote control to control the motor to position the electronic whiteboard at a desired point on the guide element.

10. A visual communication system comprising: an electronic whiteboard located on a vertical surface; and
   a track system of the vertical surface located behind electronic whiteboard to enable movement of the electronic whiteboard relative the vertical surface via the track system;
   the track system including a positioning member and a guide element;
   wherein the track system enables the electronic whiteboard to move laterally relative the vertical surface via a positioning member extending from the back of the electronic whiteboard, the positioning member including an axle and wheel assembly for rolling engagement of the whiteboard within a channel of the guide element.

11. The visual communication system of claim 10, the guide element housing a first communication device that maintains connectivity with the electronic whiteboard positioned along the length of the guide element.

12. The visual communication system of claim 11, the first communication device comprising a retractable cable.

13. The visual communication system of claim 12, the retractable cable for conducting data to or from the electronic whiteboard.

14. The visual communication system of claim 11 further comprising a converter and a second communication device, wherein the converter is adapted to receive the first communication device and wherein the converter converts a serial signal carried by the first communication device into a USB signal carried by the second communication device.

15. The visual communication system of claim 10, wherein the vertical surface is a wall.

16. The visual communication system of claim 10, wherein the guide element comprises a shock absorber at at least one end of the guide element for absorbing energy resulting from the electronic whiteboard reaching the at least one end of the guide element.

17. The visual communication system of claim 10, further comprising a second wheel assembly located behind and in proximity to a bottom of the electronic whiteboard for enabling the electronic whiteboard to remain approximately parallel with the vertical surface.

18. A visual communication system comprising:
   an electronic whiteboard located on a wall; and
   a track system of the wall to enable lateral movement of the electronic whiteboard relative the wall via the track system, the track system including a guide element having at least two channels, a first channel adapted to receive a positioning member of the electronic whiteboard, the guide element housing a first extendable cable in a second channel, wherein the first extendable cable maintains connectivity with the electronic whiteboard and the track system independent of the position of the electronic whiteboard on the guide element;

wherein the electronic whiteboard is positionable on the guide element; and wherein the guide element transmits power to the electronic whiteboard and transmits data to or from the electronic whiteboard.

19. The visual communication system of claim 18, further comprising a converter and a second cable, wherein the converter is adapted to receive the first extendable cable and wherein the converter converts a signal carried by the first extendable cable into a signal carried by the second cable.

20. The visual communication system of claim 18, the electronic whiteboard comprising a touch sensitive surface.

21. The visual communication system of claim 18, the electronic whiteboard comprising a laser-tracking surface.

22. The visual communication system of claim 18, further comprising a guard member, wherein the positioning member includes a wheel in communication with an axle, the wheel of the positioning member adapted to roll within the first channel of the guide element, and wherein the guard member is adapted to prevent the disengagement of the positioning member from the guide element.

* * * * *